(12) United States Patent
Ohnishi et al.

(10) Patent No.: US 7,850,324 B2
(45) Date of Patent: Dec. 14, 2010

(54) BACKLIGHT CHASSIS, A BACKLIGHT UNIT, AND A DISPLAY DEVICE

(75) Inventors: Takuya Ohnishi, Matsusaka (JP); Satoshi Ono, Suzuka (JP); Takeshi Ogura, Matsusaka (JP); Kazuki Nakamichi, Suzuka (JP); Yoshihiro Murakami, Tsu (JP); Takafumi Hara, Kyotanabe (JP)

(73) Assignee: Sharp Kabushiki Kaisha, Osaka (JP)

( * ) Notice: Subject to any disclaimer, the term of this patent is extended or adjusted under 35 U.S.C. 154(b) by 605 days.

(21) Appl. No.: 11/721,023

(22) PCT Filed: Dec. 12, 2005

(86) PCT No.: PCT/JP2005/022752

§ 371 (c)(1),
(2), (4) Date: Jun. 6, 2007

(87) PCT Pub. No.: WO2006/070588

PCT Pub. Date: Jul. 6, 2006

(65) Prior Publication Data

US 2009/0268473 A1    Oct. 29, 2009

(30) Foreign Application Priority Data

Dec. 28, 2004    (JP) .............................. 2004-379346

(51) Int. Cl.
*G09F 13/04* (2006.01)
*G09F 13/10* (2006.01)

(52) U.S. Cl. ..................... 362/97.1; 362/171; 362/216; 362/632

(58) Field of Classification Search ................. 362/632, 362/633, 634, 97.1, 97.2, 97.3, 97.4
See application file for complete search history.

(56) References Cited

U.S. PATENT DOCUMENTS

| | | | | |
|---|---|---|---|---|
| 6,974,221 B2 * | 12/2005 | Wu et al. | ...................... | 362/29 |
| 6,979,102 B2 * | 12/2005 | You | .......................... | 362/218 |
| 7,461,958 B2 * | 12/2008 | Takata et al. | ................. | 362/433 |
| 2003/0227767 A1 * | 12/2003 | Lee et al. | ...................... | 362/23 |
| 2004/0130885 A1 * | 7/2004 | Nakano | ........................ | 362/31 |
| 2005/0073858 A1 * | 4/2005 | Kim et al. | .................... | 362/561 |
| 2005/0207149 A1 * | 9/2005 | Ono et al. | ..................... | 362/216 |

(Continued)

FOREIGN PATENT DOCUMENTS

JP    3040060 U    8/1997

(Continued)

OTHER PUBLICATIONS

Offical Communication for PCT Application No. PCT/JP2005/022752; mailed on Jan. 17, 2006.

*Primary Examiner*—Sandra L O Shea
*Assistant Examiner*—Danielle Allen
(74) *Attorney, Agent, or Firm*—Keating & Bennett, LLP

(57) ABSTRACT

A backlight chassis that is capable of preventing an unusual noise caused by vibrations of a backlight unit or a tubular lamp houses tubular lamps arranged behind a display panel via optical sheets. The backlight chassis includes lamp holding members provided on a lamp housing surface of the backlight chassis, for holding the tubular lamps at an approximate midpoint thereof, wherein the lamp holding members and the backlight chassis are defined by a unitary molded resin member.

6 Claims, 4 Drawing Sheets

U.S. PATENT DOCUMENTS

| | | | |
|---|---|---|---|
| 2005/0265020 A1* | 12/2005 | Kim | 362/225 |
| 2006/0018130 A1* | 1/2006 | Lee | 362/632 |
| 2006/0104083 A1* | 5/2006 | Kwon | 362/559 |
| 2007/0081322 A1* | 4/2007 | Choi et al. | 362/97 |
| 2007/0242446 A1* | 10/2007 | Lee | 362/29 |
| 2007/0285948 A1* | 12/2007 | Murakami et al. | 362/632 |

FOREIGN PATENT DOCUMENTS

| | | |
|---|---|---|
| JP | 2001-210126 A | 8/2001 |
| JP | 2001-266634 A | 9/2001 |
| JP | 2002-268573 A | 9/2002 |
| JP | 2004-186080 A | 7/2004 |
| JP | 2004-220981 A | 8/2004 |

\* cited by examiner

BACKLIGHT CHASSIS, A BACKLIGHT UNIT, AND A DISPLAY DEVICE

BACKGROUND OF THE INVENTION

1. Field of the Invention

The present invention relates to a backlight chassis for housing a tubular lamp that is a light source of a display device with a backlight, and specifically relates to a backlight chassis preferably used in a liquid crystal display device including a translucent liquid crystal display panel.

2. Description of the Related Art

A liquid crystal display device including a translucent liquid crystal display panel and the like, which are cited as an example of a flat-screen display device, generally have a backlight unit arranged behind the liquid crystal display panel. The backlight unit is a device including a tubular lamp such as a cold cathode tube as a light source, which controls the properties of light emitted from the tubular lamp and projects the light toward a rear side of the display panel. The projected light passes through the display panel, making an image displayed visible on a front side of the display panel.

FIG. 3 is an exploded perspective view schematically illustrating relevant parts of a structure of a generally conventional liquid crystal display device. A liquid crystal display device 30 includes a bezel 31, a display panel 32 and a backlight unit 33. The bezel 31 is a member that defines a frame of the display panel 32, and the display panel 32 is made by bonding two panes of glass to seal in a liquid crystal therebetween.

The backlight unit 33 includes a frame 34, optical sheets 35, tubular lamps 36, a reflector 37 and a backlight chassis 38. The frame 34 is shaped like a picture frame and secures the optical sheets 35 to the backlight chassis 38. The optical sheets 35 are for controlling the properties of light which enters the display panel 32 from the tubular lamps 36. In this case, the tubular lamps 36 are U-shaped, and left-side ends thereof are inserted into electrode part holders 39 so as to be secured to the backlight chassis 38 at the left-end positions, as shown in a plan view of FIG. 4. The reflector 37 is laid under the tubular lamps 36, for reflecting the light emitted from the tubular lamps 36 toward the display panel 32. In order to improve reflectivity, projections 37a in a crest shape are provided on the reflector 37 so as to be located respectively between tube sections 36a of the tubular lamps 36.

The backlight chassis 38, which is prepared by subjecting a metal plate material to plate metal processing so as to have a substantially square shape, includes a lamp housing portion 38a configured by a bottom portion and side-wall portions, and support portions 38b extending outward from the side-wall portions. The frame 34 is secured to the support portions 38b while interposing the optical sheets 35 and the reflector 37.

The tubular lamps 36 are secured to the lamp housing portion 38a of the backlight chassis 38 with the use of the above-mentioned electrode part holders 39 and also with the use of lamp clips 40 for holding the tube sections 36a at an approximate midpoint thereof as illustrated, and the lamp clips 40 are provided in pairs on a coupling plate 41 which is arranged to straddle the projection 37a of the reflector 37. In addition, on a crest portion 41a in the middle of the coupling plate 41, a sheet holding pin 42 is provided. The sheet holding pin 42 is used for preventing the optical sheets 35 which are arranged above from bending downward to preclude luminance irregularity, and has a length so as to leave a predetermined space between the optical sheets 35 and the reflector 37. The lamp clips 40 and the sheet holding pin 42 are molded via the coupling plate 41 in one piece of resin.

A member 43 including the lamp clips 40 and the sheet holding pin 42 is secured to the backlight chassis 38 by making insertion and engagement of protrusions 41b which are provided beneath the coupling plate 41 into and with engaging holes 44 which are punched to be formed both in the reflector 37 and the lamp housing portion 38a, as shown in a detailed drawing in a circle in FIG. 3.

Incidentally, as a prior art literature relating to the present invention, Japanese Patent Application Unexamined Publication No. 2001-210126 is cited.

When using a liquid crystal television receiver or the like, which is cited as a specific example of the liquid crystal display device 30 incorporating the backlight unit 33 in the case of including a loudspeaker system such a speaker, vibrations generated by the loudspeaker system propagate to the backlight unit 33 to sometimes vibrate not only the backlight unit 33 but also the tubular lamps 36 housed therein. At the time of such vibration, if there is looseness of the securing by the engagement of the member 43 including the lamp clips 40 and the sheet holding pin 42 with the backlight chassis 38, a problem of causing an unusual noise such as a fluttering sound arises. However, removing such looseness is difficult in view of manufacturing tolerances and the like of the members, and causes an increase in cost.

In addition, if the backlight unit 33 vibrates at a specific vibration frequency, the vibrations of the tubular lamps 36 and the vibrations of the backlight chassis 38 produce resonance to increase amplitude of the tube sections 36a on the right sides of the lamp clips 40 shown in FIG. 4, and there is a case where U-shaped sections 36b contact the reflector 37 or the like to make a contact noise, or to break the tubular lamps 36. These problems can be solved by placing the members 43 including the lamp clips 40 and the sheet holding pin 42 in vicinities of the U-shaped sections 36b; however, since the optical sheets 35 bend downward more at a center portion 35a, it is not preferable to move the sheet holding pins 42 toward the U-shaped sections 36b.

As a countermeasure against the above-described problems, instead of the configuration in which the lamp clips 40 and the sheet holding pin 42 are formed in one piece to constitute the member 43, another configuration is possible in which the lamp clips 40 and the sheet holding pin 42 are formed in separate pieces, which are placed in their desired positions, respectively. However, such a configuration increases the number of components as well as the number of securing positions by engagement with the backlight chassis 38, resulting in an increase in positions producing an unusual noise such as a fluttering sound as described above.

SUMMARY OF THE INVENTION

In order to overcome the problems described above, preferred embodiments of the present invention provide a backlight chassis that is capable of preventing an unusual noise caused by vibrations of a backlight unit or a tubular lamp, and also provide a backlight unit and a display device including the backlight chassis.

According to a preferred embodiment of the present invention, a backlight chassis for housing a tubular lamp arranged behind a display panel via optical sheets includes a lamp holding member provided on a lamp housing surface of the backlight chassis for holding the tubular lamp at an approximate midpoint thereof, wherein the lamp holding member and the backlight chassis are defined by a unitary molded resin member.

In this case, it is preferable that the backlight chassis further includes a sheet holding member provided on the lamp housing surface for holding the optical sheets which are placed above the tubular lamp while leaving a predetermined gap spaced from the lamp housing surface, wherein the sheet holding member and the backlight chassis are defined by a unitary molded resin member.

In addition, it is preferable that the backlight chassis is made from a white color synthetic resin, and the lamp housing surface functions as a reflection surface to reflect light emitted from the tubular lamp and let the light enter the display panel. Further, it is preferable that a rear surface of the backlight chassis is subjected to light shielding treatment, the rear surface being opposite to the lamp housing surface.

It is preferable that a backlight unit includes the backlight chassis, and further, a display device includes the backlight unit.

According to the backlight chassis having the above-described configuration in which the backlight chassis includes the lamp holding member provided on the lamp housing surface for holding the tubular lamp at an approximate midpoint thereof, wherein the lamp holding member and the backlight chassis are defined by a unitary molded resin member, the need for securing the lamp holding member to the backlight chassis is eliminated. Therefore, an unusual noise caused by securing the sheet holding member to the backlight chassis is prevented. In addition, as the lamp holding member and the backlight chassis are molded in one piece, easy placement of the lamp holding member in a desired position, a reduction in the number of components as well as simplification of the structure, and an improvement in workability of lamp installation can be achieved.

In this case, by configuring the backlight chassis to further include the sheet holding member for holding the optical sheets which are placed above the tubular lamp while leaving the predetermined gap spaced from the lamp housing surface, wherein the sheet holding member and the backlight chassis are defined by a unitary molded resin member, the need for securing the sheet holding member to the backlight chassis is eliminated. Therefore, an unusual noise caused by securing the sheet holding member to the backlight chassis is prevented. In addition, because the sheet holding member and the backlight chassis are molded in one piece, easy placement of the sheet holding member in a desired position and a reduction in the number of components as well as simplification of the structure can be achieved.

In addition, by configuring the backlight chassis to be made from the white color synthetic resin, and the lamp housing surface to function as the reflection surface to reflect the light emitted from the tubular lamp to let the light enter the display panel, the need for separately providing a reflector as in the conventional art is eliminated; therefore, a reduction in the number of components, simplification of the structure, and a reduction in production cost can be achieved. Further, by configuring the rear surface of the backlight chassis to be subjected to the light shielding treatment, the rear surface being opposite to the lamp housing surface, a light leak from the rear surface can be prevented.

By preparing the backlight unit including the backlight chassis having the above-described configuration and the display device incorporating the backlight unit, an unusual noise which is produced in the case of including a loudspeaker system can be prevented even though vibrations which are generated by the loudspeaker system when the display device is used propagate.

Other features, elements, characteristics and advantages of the present invention will become more apparent from the following detailed description of preferred embodiments with reference to the attached drawings.

DETAILED DESCRIPTION OF PREFERRED EMBODIMENTS

Figure 1:
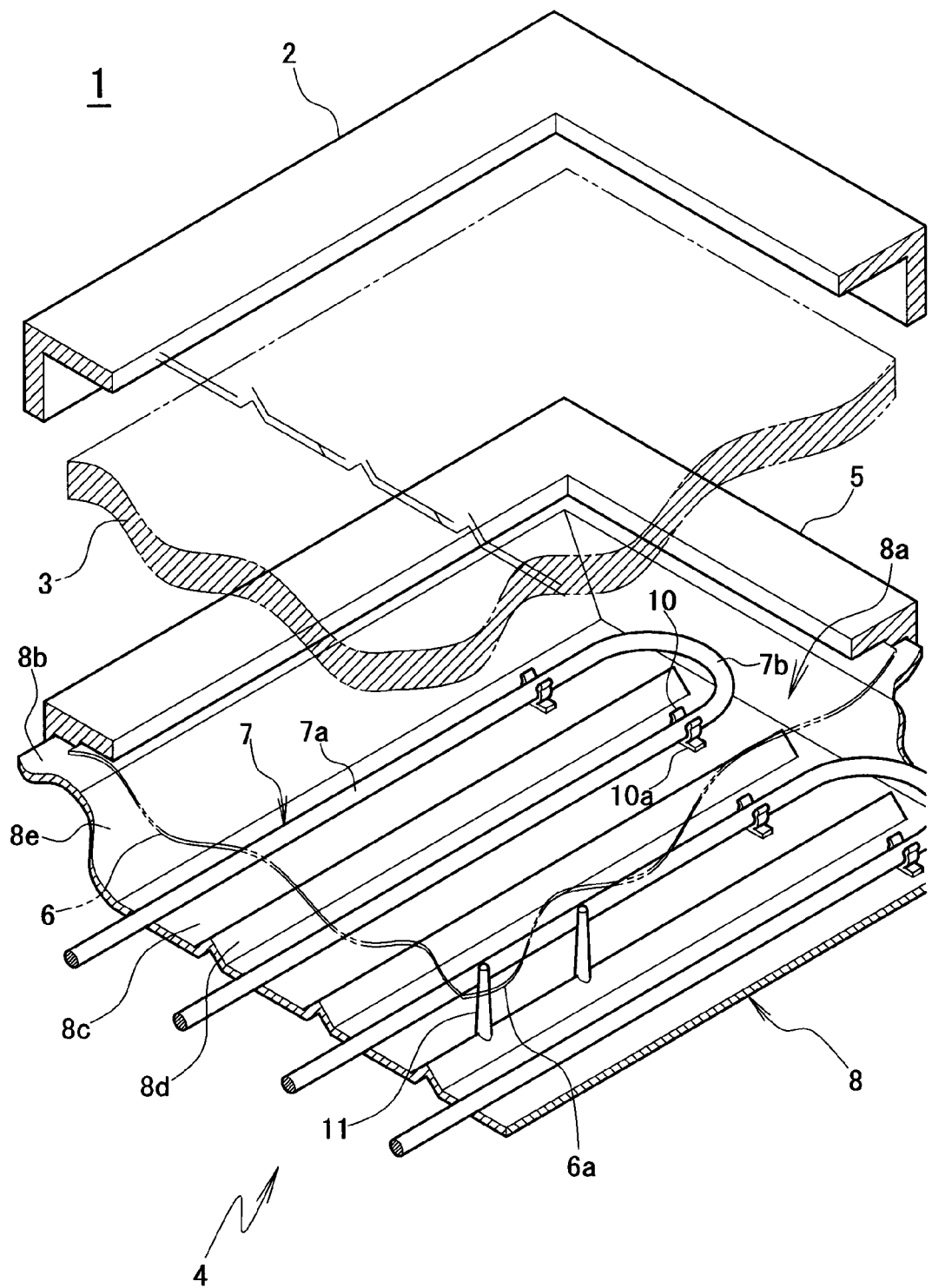
FIG. 1 is an exploded perspective view schematically illustrating a backlight unit included in a liquid crystal display device according to a preferred embodiment of the present invention.
Figure 2:
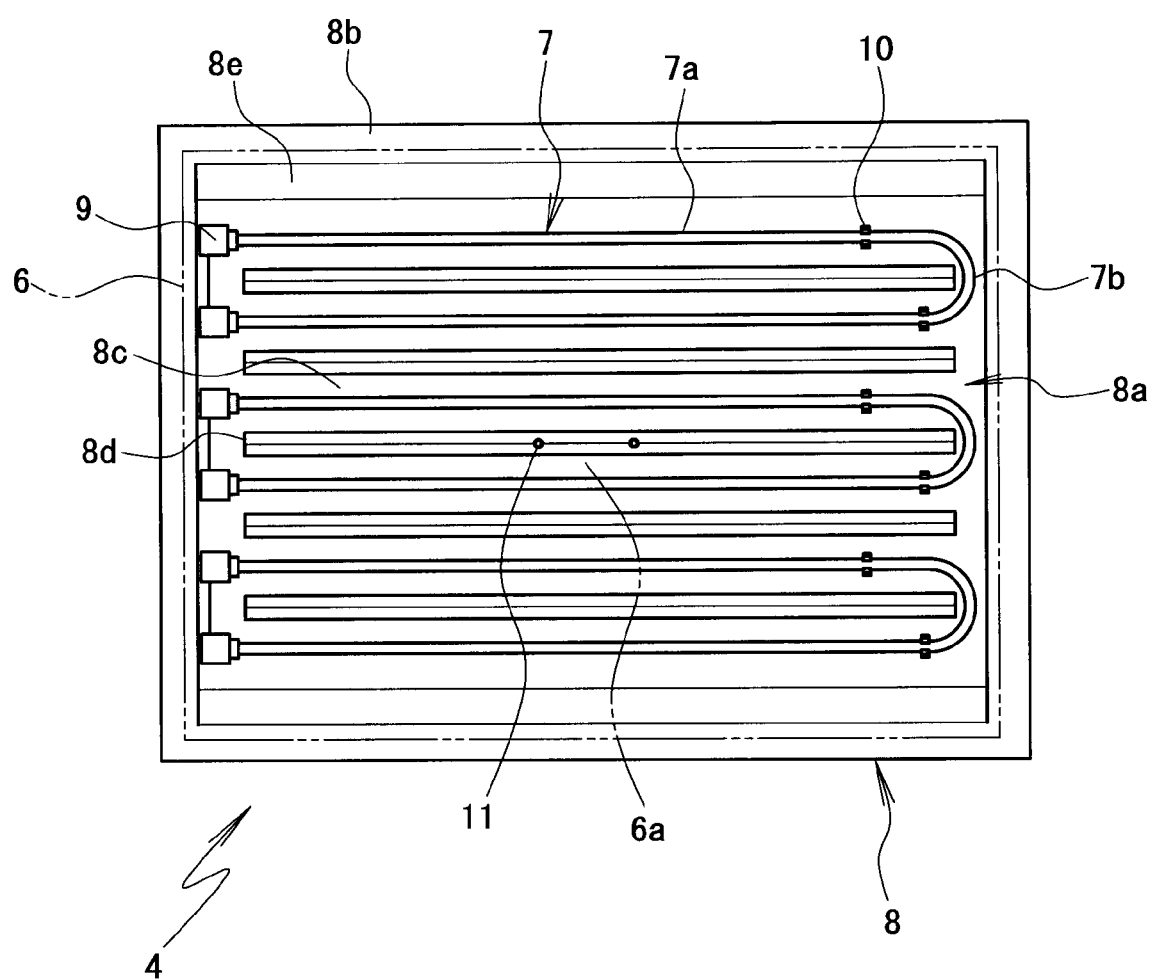
FIG. 2 is a top view showing the backlight unit shown in FIG. 1 in a state where a frame is removed.
Figure 3:
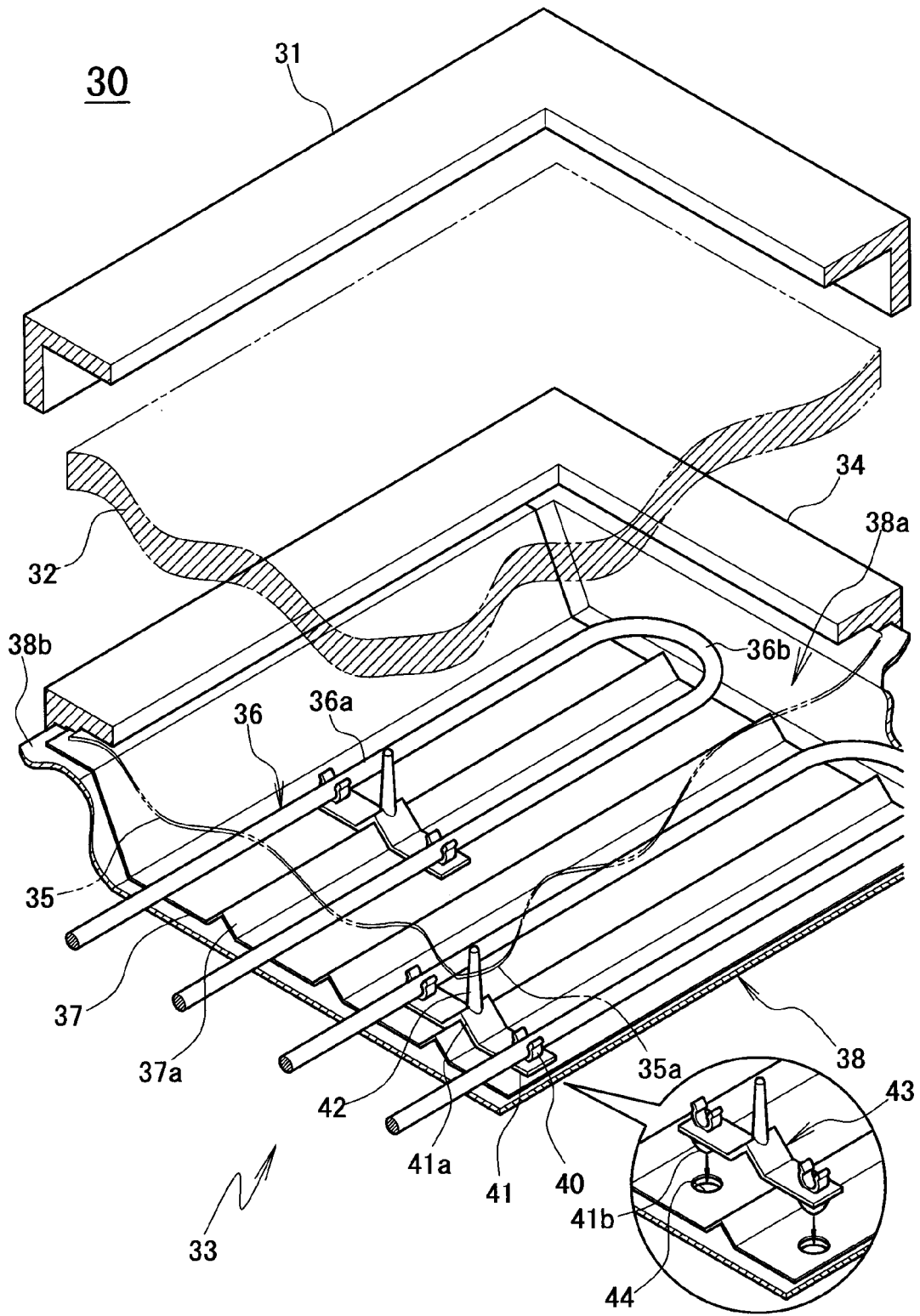
FIG. 3 is an exploded perspective view schematically showing a backlight unit included in a conventional liquid crystal display device.
Figure 4:
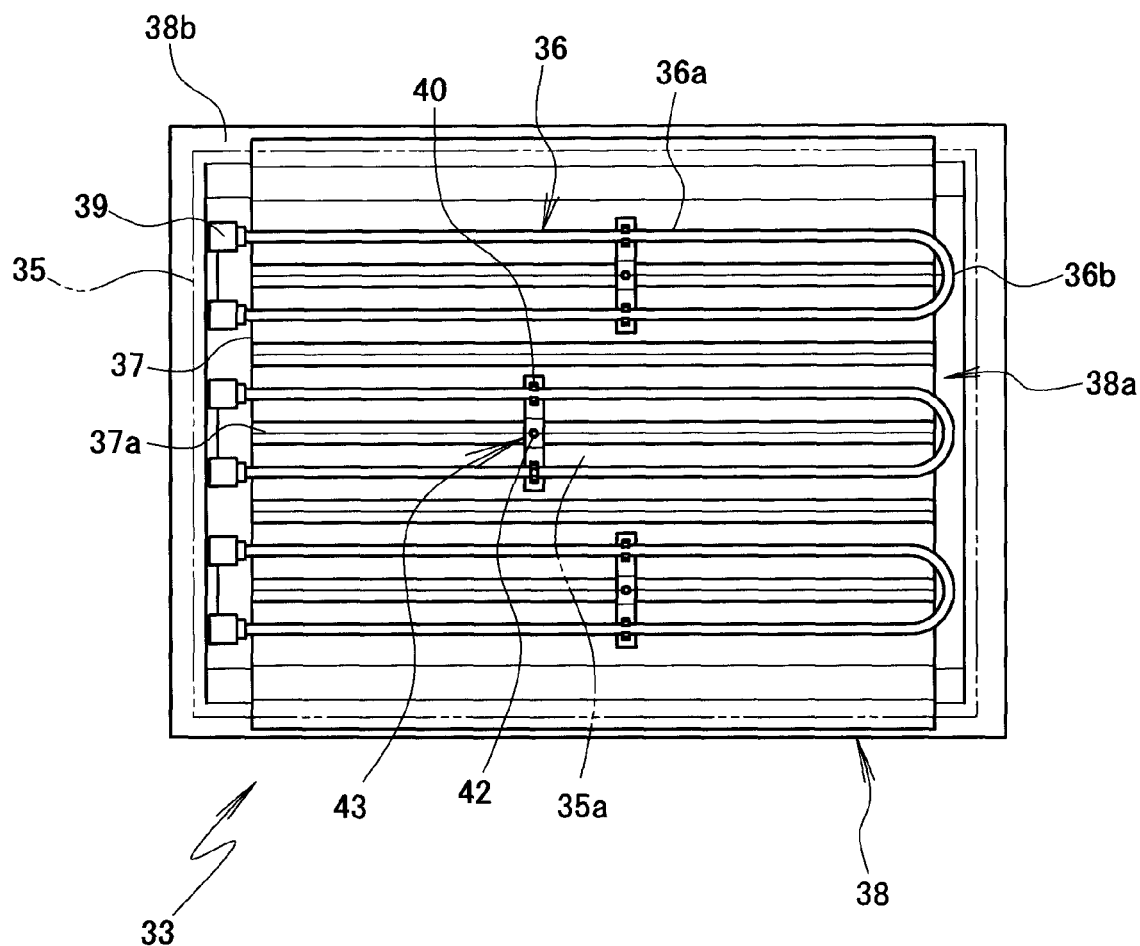
FIG. 4 is a top view showing the backlight unit shown in FIG. 3.

A detailed description of a display device according to preferred embodiments of the present invention will now be given with reference to the accompanying drawings. FIG. 1 is an exploded perspective view schematically illustrating relevant parts of a structure of a liquid crystal display device according to preferred embodiments of the present invention. FIG. 2 is a top view showing the backlight unit shown in FIG. 1 in a state where a frame is removed. Besides, the exploded perspective view of FIG. 1 is an enlarged view of an upper right portion of the backlight unit of FIG. 2.

As shown in FIG. 1, a liquid crystal display device 1 includes a bezel 2, a display panel 3 and a backlight unit 4. The bezel 2 is a member defining a frame of the display panel 3, which protects the display panel 3 and ensures strength of the entire liquid crystal display device 1. The display panel 3 is made by bonding two panes of glass to seal in a liquid crystal therebetween.

The backlight unit 4 includes a frame 5, optical sheets 6, tubular lamps 7 and a backlight chassis 8. The frame 5 is preferably shaped like a picture frame and secures the optical sheets 6 to the backlight chassis 8. The optical sheets 6 are made by stacking members in the shape of a plate or sheet such as a diffusion plate, a diffusion sheet, a lens sheet and a polarizing reflection film in order to control the properties of light which is emitted from the tubular lamps 7 and enters the display panel 3. The tubular lamps 7 are preferably U-shaped cold cathode tubes, and left-side ends thereof are inserted into electrode part holders 9 so as to be secured to the backlight chassis 8 at the left-end positions, as illustrated.

The backlight chassis 8 is preferably made by molding a white color synthetic resin material into an approximately square shape, which includes a lamp housing portion 8a configured by a bottom portion and four side-wall portions, and support portions 8b including four edges extending outward from the four side-wall portions. The frame 5 is secured to the support portions 8b while interposing the optical sheets 6. Incidentally, behind the backlight chassis 8, an inverter circuit board including an inverter circuit to drive the tubular lamps 7 is installed, which is not illustrated. In addition, a rear surface of the backlight chassis 8 is subjected to light shielding treatment to be made black or the like, so that a leak of the light emitted from the tubular lamps 7 from the rear surface is prevented.

The lamp housing portion 8a is preferably made from the synthetic resin material of white color being a color to reflect light most efficiently, so that a surface of the lamp housing portion 8a is configured as a reflection surface 8c having a function of reflecting the light emitted from the tubular lamps 7 toward the display panel 3. In addition, in order to further improve reflectivity, reflection crests 8d formed to project in a crest shape are provided on the reflection surface 8c so as to be placed respectively between tube sections 7a of the tubular lamps 7. Likewise, in order to further improve reflectivity, the side-wall portions on the longer edges of the lamp housing portion 8a are configured as inclined planes 8e.

For securing the tubular lamps 7 to the lamp housing portion 8a of the backlight chassis 8, the electrode part holders 9 are provided as mentioned as above, and as illustrated, lamp clips 10 for holding the tube sections 7a at an approximate midpoint are provided while being molded in one piece with the backlight chassis 8. By the lamp clips 10, the tube sections 7a are held so as to leave a gap equal to a thickness of a base 10a of the lamp clip 10 spaced from the reflection surface 8c.

In addition, to the center reflection crest 8d, sheet holding pins 11 are provided while being molded in one piece with the backlight chassis 8. The sheet holding pins 11 are used for preventing the optical sheets 6 which are arranged above the sheet holding pins 11 from bending downward to preclude luminance irregularity, and have a length so as to leave a predetermined space between the optical sheets 6 and the reflection surface 8c.

The liquid crystal display device 1 may include a loudspeaker system such as a speaker. In such a case, vibrations generated by the loudspeaker system sometimes propagate to the backlight unit 4, but no unusual noise is produced since the lamp clips 10 and the sheet holding pins 11 of the backlight unit 4 configured as above are provided integrally with the backlight chassis 8, while an unusual noise is caused by the conventional securing structure of such members.

In addition, the tubular lamps 7 are held by the lamp clips 10 in the vicinities of U-shaped sections 7b as shown in FIG. 2, so that resonance which is produced in the conventional art can be precluded. Accordingly, the tubular lamps 7 are prevented from contacting the reflection surface 8c to make a contact noise or to be broken. Further, the sheet holding pins 11 are placed only in positions immediately below a center portion 6a of the optical sheets 6 as shown in FIG. 2 since the optical sheets 6 structurally bend downward more at the center portion 6a.

As described above, since the lamp clips 10 and the sheet holding pins 11 are molded in one piece with the backlight chassis 8, no unusual noise is produced and it is easy to place them in their desired positions (the positions in the vicinities of the U-shaped sections 7b of the tubular lamps 7 for the lamp clips 10, and the positions immediately below the center portion 6a of the optical sheets 6 for the sheet holding pins 11) or the like.

Further, since the backlight chassis 8 is preferably made from the white color synthetic resin and the surface of the lamp housing portion 8a functions as the reflection surface 8c to reflect the light emitted from the tubular lamps 7 to let it enter the display panel 3, the need for separately providing a reflector as in the conventional art is eliminated.

The foregoing description of preferred embodiments and the implementation example of the present invention has been presented for purposes of illustration and description with reference to the drawings. However, it is not intended to limit the present invention to the preferred embodiments, and modifications and variations are possible as long as they do not deviate from the principles of the present invention. For example, for the tubular lamps 7, tubular lamps having a shape other than a U shape can be used. It is also possible to separately provide an additional reflector to the above-mentioned configuration. In addition, the arrangement of the lamp clips 10 and the sheet holding clips 11 is not limited to the above-described preferred embodiments.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A backlight chassis for housing a tubular lamp including a U-shaped portion and arranged behind a display panel via optical sheets, the backlight chassis comprising:
a lamp holding member provided on a lamp housing surface of the backlight chassis at a position close to the U-shaped portion of the tubular lamp; and
electrode part holders provided on the lamp housing surface at positions where ends of the tubular lamp are inserted into the electrode part holders; wherein
the lamp holding member and the backlight chassis are defined by a unitary molded resin member.

2. The backlight chassis according to claim 1, further comprising a sheet holding member provided on the lamp housing surface at a position immediately below a central portion of the optical sheets, and arranged to hold the optical sheets which are placed above the tubular lamp while leaving a predetermined space from the lamp housing surface, wherein the sheet holding member and the backlight chassis are defined by the unitary molded resin member.

3. The backlight chassis according to claim 1, wherein the backlight chassis is made from a white color synthetic resin, and the lamp housing surface functions as a reflection surface to reflect light emitted from the tubular lamp and let the light enter the display panel.

4. The backlight chassis according to claim 1, wherein a rear surface of the backlight chassis is subjected to light shielding treatment, the rear surface being opposite to the lamp housing surface.

5. A backlight unit comprising the backlight chassis according to claim 1.

6. A display device comprising the backlight unit according to claim 5.

* * * * *